(12) United States Patent
Su et al.

(10) Patent No.: US 9,600,741 B1
(45) Date of Patent: Mar. 21, 2017

(54) ENHANCED IMAGE GENERATION BASED ON MULTIPLE IMAGES

(71) Applicant: Amazon Technologies, Inc., Reno, NV (US)

(72) Inventors: Che-Chun Su, Seattle, WA (US); Vivek Shah, Issaquah, WA (US); Oleg Rybakov, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 170 days.

(21) Appl. No.: 14/661,438

(22) Filed: Mar. 18, 2015

(51) Int. Cl.
  *G06T 5/50* (2006.01)
  *G06K 9/52* (2006.01)
  *G06T 7/00* (2006.01)

(52) U.S. Cl.
  CPC . *G06K 9/52* (2013.01); *G06T 7/00* (2013.01)

(58) Field of Classification Search
  CPC . G06T 2207/10141; G06T 2207/20208; G06T 2207/20016; G06T 5/50
  See application file for complete search history.

(56) References Cited

U.S. PATENT DOCUMENTS

| | | | |
|---|---|---|---|
| 6,271,847 B1 * | 8/2001 | Shum | G06T 15/04 345/418 |
| 6,469,710 B1 * | 10/2002 | Shum | G06T 15/04 345/619 |
| 8,885,976 B1 * | 11/2014 | Kuo | H04N 5/211 382/103 |
| 8,989,484 B2 * | 3/2015 | Moon | H04N 5/2355 382/162 |
| 2013/0028509 A1 * | 1/2013 | Moon | H04N 5/2355 382/162 |
| 2013/0070965 A1 * | 3/2013 | Jang | G06K 9/60 382/103 |

* cited by examiner

*Primary Examiner* — Wesley Tucker
(74) *Attorney, Agent, or Firm* — Seyfarth Shaw LLP; Ilan N. Barzilay

(57) ABSTRACT

A plurality of instances of image data can be analyzed, and favored aspects of each instance identified and utilized in generating an enhanced output image. For example, a plurality of instances of image data can be analyzed to identify metric values associated with each pixel location, such as contrast, saturation, and exposedness. A weight map corresponding to each metric is generated for each instance of image data, each weight map indicating a value for the metric at each pixel location of the instance of image data. The weight maps associated with each instance of image data are merged, and a Gaussian pyramid of the merged weight map for each instance of image data is determined along with a Laplacian pyramid for each instance of image data. The Gaussian pyramids and Laplacian pyramids are merged into a Laplacian pyramid, which is then collapsed to form an enhanced output image.

20 Claims, 8 Drawing Sheets

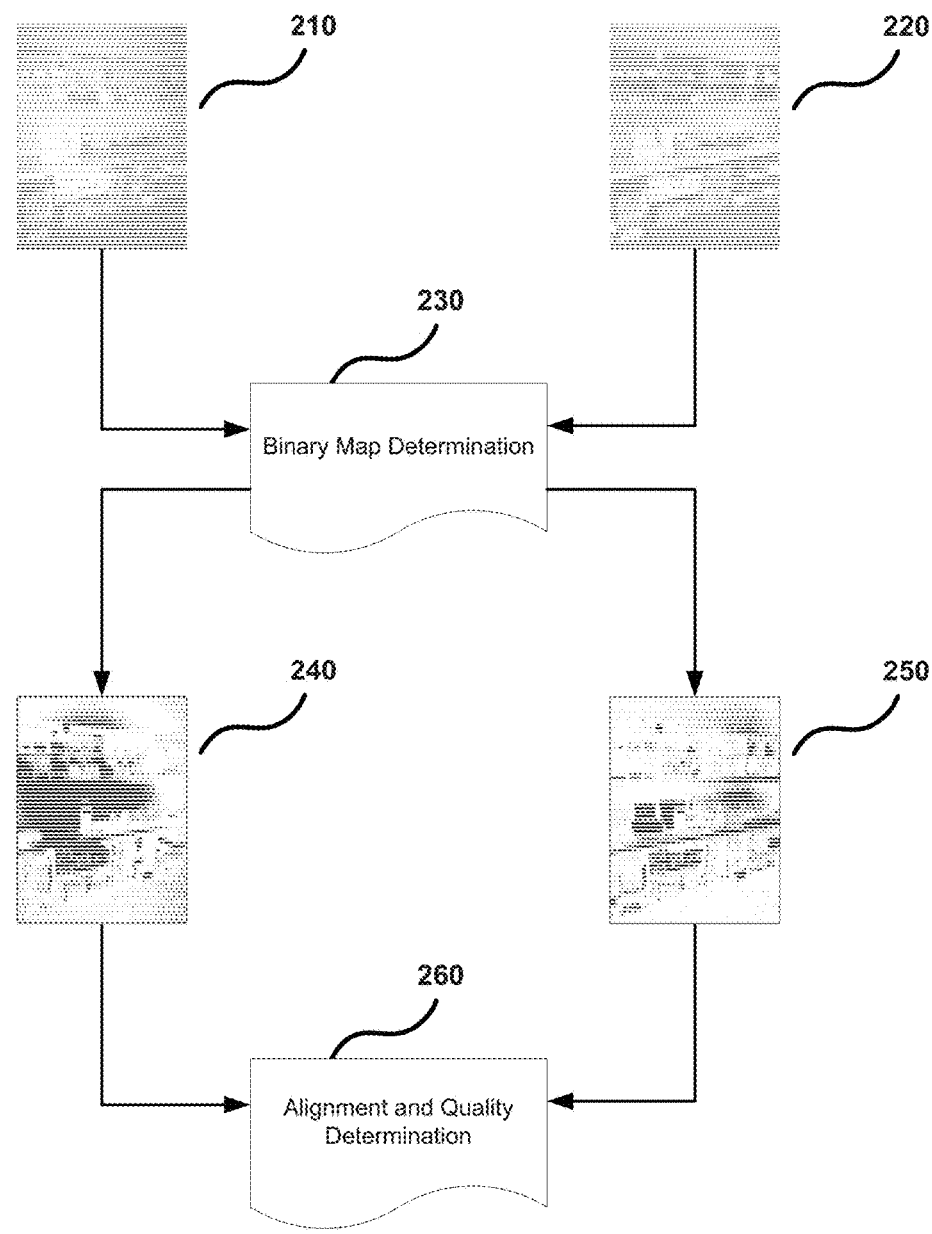

ENHANCED IMAGE GENERATION BASED ON MULTIPLE IMAGES

BACKGROUND

Digital photography allows people to take more pictures than ever before. Unlike with film cameras, digital cameras can provide an immediate viewing experience, and the number of pictures able to be taken is only limited by storage space and the speed with which the digital camera can take the pictures. These factors allow people to take multiple pictures of a scene. Often times, however, despite taking numerous pictures of a scene, there is no "best" picture. One picture may be underexposed or overexposed in some areas, one picture may be blurry, one picture may have poor contrast, etc. This can lead to users taking numerous pictures in an effort to best capture a scene, which reduces available storage on the device and can require a great deal of time to manually review the pictures to determine the best one.

BRIEF DESCRIPTION OF THE DRAWINGS

Various embodiments in accordance with the present disclosure will be described with reference to the drawings, in which:

FIG. 2 illustrates an example process for aligning multiple instances of image data in accordance with various embodiments;

DETAILED DESCRIPTION

Systems and methods in accordance with various embodiments of the present disclosure overcome one or more of the above-referenced and other deficiencies in conventional approaches to generating an enhanced image from a set of input image data, such as one or more instances of image data captured by an image capture element. Image data can be used to generate, display or otherwise represent "pictures," "photos," "images," "frames of video," etc. In particular, various embodiments of the present disclosure enable the capture image data associated with a number of images using various settings of an image capture element such as a digital camera or other type of imaging sensor. The settings can include, e.g., flash illumination, shutter speed, exposure time, etc. For each image, there may be image data that includes the pixel data, which can be analyzed to determine a value corresponding to a particular metric associated with each pixel. Each pixel can have a unique identifier or address, sometimes referred to as pixel location, and each pixel location can be associated with a determined value corresponding to a particular metric. Any number of metrics may be used, e.g., exposedness, contrast, saturation, etc. Weight maps, each corresponding to one of the metrics, and each describing the value of the metric at each pixel location, are generated for each instance or set of image data. The weight maps for each instance of image data are merged into a single weight map that describes the values at each pixel location, the values related to the quality of the pixel location in relation to the surrounding pixel locations with regard to the measured metrics. For each image, a Gaussian pyramid is determined based on the single weight map and a Laplacian pyramid is determined based on the corresponding image data. The Gaussian pyramid and Laplacian pyramid are merged into a Laplacian pyramid, which is then collapsed to generate an enhanced image that combines the "favored," or highest quality parts of each image data into a single image.

Other variations, functions, and advantages are described and suggested below as may be provided in accordance with the various embodiments.

Figure 1A:
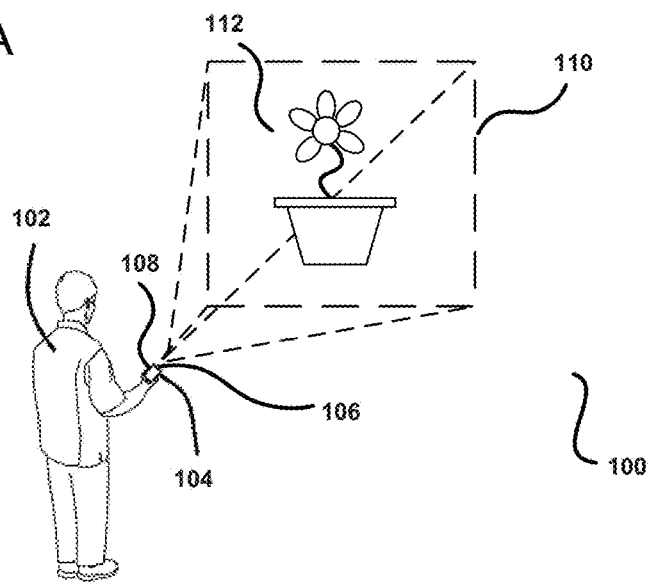
FIGS. 1A-1D illustrate an example of a user capturing image data using a computing device in accordance with various embodiments.

FIG. 1A illustrates an example situation 100 of a user 102 preparing to capture one or more instances of image data (or video data) of a scene 110 using an image capture element of a digital camera system ("camera") 106 of a computing device 104. Although a portable computing device (e.g., a smart phone, tablet, or e-book reader) is shown that can be held in the user's hands, it should be understood that other types of electronic devices can utilize aspects of the various embodiments as should be apparent in light of the teachings and suggestions contained herein. In this example, the scene 110 includes a flower 112. Using an appropriate application executing on computing device 104, the user is able to obtain a live preview of the scene for display on a touch-screen 108 of the computing device by positioning the computing device such that the scene is within a field of view of the camera system 106. Thus, the touchscreen can operate as a viewfinder for the camera system 106 before the user takes a snapshot of the scene 110.

In various embodiments, multiple pictures may be taken within a predetermined span of time. For example, a single press of a "shutter button" or its equivalent (e.g., a user interface element on a touchscreen) may initiate capturing a sequence of pictures within a few milliseconds. In another example, an image capture element, such as a camera incorporated into a cellphone, may be placed into a mode where video data is constantly streaming through the camera and being captured for a period of time, and a press of the shutter button may cause multiple frames of the video data to be captured as image data. For example, one of the instances of image data may be a video frame captured 1 millisecond ago, another one of the instances of image data may a video frame captured at the time the shutter button is pressed, and another one of the instances of image data may be a video frame captured 1 millisecond from the button press.

In another embodiment, a camera may take multiple instances of image data using an image capture element, each instance of image data having different characteristics, such as those resulting from the camera having different settings or options enabled for each individual instance of image data (or video frame). For example, one press of a shutter button may result in three pictures being taken in quick succession over a (generally short) period of time. The first picture may be accompanied by an illumination element (e.g., flash or other type of light emitting device incorporated into the device or elsewhere, which causes visible, ultraviolet, infrared or other type of light to be projected in the field of view of the camera(s) included in the device) being activated and illuminating the scene. The second picture may be captured with no flash activated. The third picture may have a completely different setting enabled, such as a stability control. Other types of settings or properties that may be consistent or change for each picture of the sequence of pictures (e.g., from 2 to N pictures) may be exposure time, focal length, illumination element activation, shutter speed, aperture, white balance, shooting mode, exposure bracketing, focus mode, or ISO setting. Other settings or properties may be used as well in various embodiments.

Figure 1B:
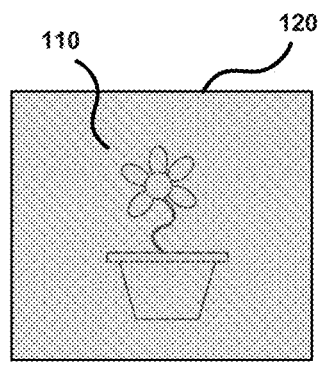
Figure 1C:
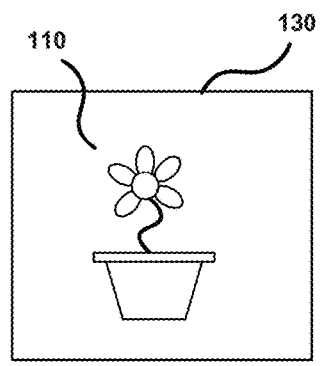
Figure 1D:
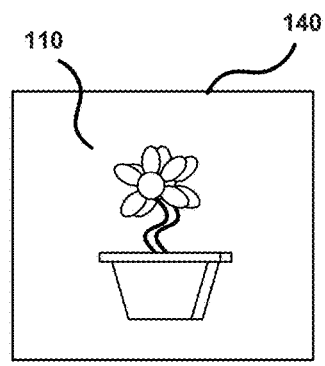

FIGS. 1B-1D illustrate example instances of image data 120, 130, 140 of a sequence of instances of image data 150 taken of scene 110, for example by one of the above-described approaches. FIG. 1B is an instance of image data 120, for example taken without a flash, using only ambient illumination to capture the instance of image data. In some cases, the level of illumination may be enough to capture the flower 112 and the surrounding scene 110; however, in some cases, one or more areas of the instance of image data 120 may be under-exposed because of a lack of sufficient light. For example, an auto-exposure algorithm may calculate settings (e.g., ISO, shutter speed, aperture, etc.) that are appropriate for a portion of the scene 110 that has enough light, which can result in under-illuminated areas of the scene 110 being too dark.

As described above, one approach to solve the problem of imperfect individual pictures is to take multiple pictures with one press of a shutter button. Hence, FIG. 1C is another instance of image data 130 of the sequence of instances of image data 150, for example taken within a few milliseconds with a single shutter button press. In the picture 130 of FIG. 1C, as opposed to the picture 120 of FIG. 1B, the camera flash is utilized. While use of a flash can provide sufficient illumination to correct the under-exposedness discussed with regard to the instance of image data 120 of FIG. 1B, it can also result in over-exposedness of one or more areas of the instance of image data, for reasons similar to those discussed above. For purposes of this disclosure, the "exposedness" of pixel data and/or image data corresponds to a level, state, or quality of the exposure associated with the pixel data and/or image data. In some examples, "exposure" corresponds a setting related to the time of a single shutter cycle. Image data may be described as having a high level of exposedness (over-exposedness) when it has a loss of highlight detail, i.e., when important bright parts of image data are "washed out" or effectively all white. Image data may be described as having a low level of exposedness (under-exposedness) when it has a loss of shadow detail, i.e., when important dark areas are "muddy" or indistinguishable from black.

FIG. 1C is another instance of image data 140 of the sequence of instances of image data 150. In this example instance of image data, elements of the scene 110 are blurry, for example because the camera shook at the time of exposure. This can occur, for example, because the user's hands shake a tiny amount, which amplifies into a larger amount in the camera device. If settings of the image capture element are inadequate to compensate for the motion (e.g., high shutter speed), then the motion can result in blur. Blur may also be introduced by objects in motion (e.g., a picture subject or another object like a car in the background) that are traveling too fast for the image capture element of the camera to capture with the settings in use.

Conventional approaches to get the best possible picture from a sequence of pictures include reviewing the individual pictures to choose one with the least flaws. This approach has several drawbacks. For example, if a large number of pictures are taken, then it may take a great deal of time to review them all. Further, as in the example of FIGS. 1B-1D, merely taking several pictures in a sequence over a small period of time does not guarantee a "perfect" picture. Each picture in the sequence 150 has drawbacks (e.g., under-exposed in some areas, over-exposed in some areas, blur introduced by motion of the image capture element or because of objects in frame, etc.).

Other conventional approaches to getting an acceptable picture from multiple pictures include High Dynamic Range (HDR) techniques. HDR approaches generally use multiple pictures in an effort to add more dynamic range (i.e., a ratio of light to dark) to pictures. Instead of just taking one picture, HDR generally uses several pictures taken at different exposure time settings, which are then combined together into a single "HDR" picture. Such approaches have several drawbacks. For example, HDR pictures can take longer to process, because multiple instances of image data must be processed to create a single picture. This can add lag time before the image capture element is ready to take another picture. Further, HDR only uses overall exposure time of pictures to create a merged HDR picture. Other aspects of the photograph, such as blur or areas of uneven exposedness, are not taken into account. Further, HDR approaches do not work in all scenarios. Blur can negatively affect the HDR algorithms, as can vivid colors and areas of high contrast.

Systems and methods in accordance with various embodiments overcome these and other deficiencies by providing a simplified approach to selecting favored aspects from multiple instances of image data to create an enhanced output image that incorporates the "best" parts from each instance of image data into the final enhanced output image.

FIG. 2 illustrates an example process 200 for determining quality and alignment of one or more instances of image data in accordance with various embodiments. In the example of FIG. 2, the two instances of image data 210, 220 are to be processed in order to compensate for poor quality (e.g., over- or under-exposedness, excessively high or excessively low contrast, over- or under-saturated, etc.) of one or more of the instances of image data 210, 220, and/or any translational misalignment between the instances of image data 210, 220 that may cause unwanted artifacts in a final output enhanced image. While two images 210, 220 are used in the example of FIG. 2, any number of images may be used according to various embodiments.

According to an embodiment, a binary map is determined 230 for each instance of image data 210, 220. For example, a median value of one or more particular metrics (e.g., exposedness, contrast, saturation, etc.) is determined for each instance of image data 210, 220. In one example embodiment, for each instance of image data 210, 220, the exposedness value of each pixel in the instance of image data is determined (e.g., the exposedness value at each pixel location of the instance of image data). In some embodiments, less than each pixel location of an instance of image data may be used (e.g., regions of an instance of image data by be used).

Once an exposedness value (or other metric) is calculated for each pixel location of the instance of image data (or a subset of the pixel locations), then, according to an embodiment, the median value of the set of calculated values for the particular metric is identified for the instance of image data. The value of the particular metric at each pixel location (or for the subset of pixel locations) of the instance of image data is then compared to the median value, and the difference in the values is determined. Binary maps 240, 250 are generated for each instance of image data 210, 220. According to an embodiment, each pixel location of the binary maps 240, 250 is comprised of white binary pixel data or black binary pixel data, where white binary pixel data for a particular pixel location in a binary map 240, 250 corresponds to the respective pixel location in the instance of image data 210, 220 having a value for the particular metric that is within some threshold of difference as compared to the median metric value for the instance of image data 210, 220. According to an embodiment, black binary pixel data for a particular pixel location in a binary map 240, 250 corresponds to the respective pixel location in the instance of image data 210, 220 having a value for the particular metric that is outside some threshold of difference as compared to the median metric value for the instance of image data 210, 220. While "white" and "black" will be used with reference to the binary pixel data as described herein, it should be understood that any color or other identifier may be used to differentiate between pixel locations depending on their metric value's difference as compared to a median metric value, and that depending on various embodiments, any color that may be used with reference to the binary pixel data is not necessarily required to be perceptible to a human or a machine.

In the example embodiment of FIG. 2, the instances of image data 210, 220 are each comprised of multiple pixels, each pixel having a particular pixel location (e.g., x, y coordinates). In the binary map determination 230 example of FIG. 2, at each pixel location of each instance of image data 210, 220, the exposedness value of the pixel is determined, although as discussed herein, a subset of pixel locations and/or any type of metric may be used. Once each pixel location of each instance of image data 210, 220 is associated with a particular exposedness value, the median value of the exposedness values determined for each instance of image data 210, 220 is determined (e.g., the "median exposedness value" of the instance of image data).

As part of the example binary map determination process 230 of FIG. 2, each pixel location's exposedness value is compared to the respective median exposedness value for each instance of image data 210, 220. A difference between the exposedness value of each pixel location and the respective median exposedness value is determined, and this difference is compared to a threshold value. In various embodiments, the threshold value may be predetermined or correspond to a user-selectable setting of a computing device; the threshold value may be a software or hardware setting, for example, and may be changed through various methods such as a software update or other command, such as from a user or administrator.

For pixel locations of an instance of image data where the difference of the pixel location's exposedness value as compared to the median exposedness value for the instance of image data is less than the threshold value, then that pixel location may be considered "well-exposed" because it is close to the median exposedness value of the image data (e.g., not over- or under-exposed), and this means the pixel at that pixel location will be a higher "quality" pixel in the image data.

For pixel locations of an instance of image data where the difference of the pixel location's exposedness value as compared to the median exposedness value for the instance of image data is greater than the threshold value, then that pixel location may be considered "poorly-exposed" because it is further away from the median exposedness value of the image data (e.g., over- or under-exposed), and this means the pixel at that pixel location will be a lower "quality" pixel in the image data.

In the example embodiment of FIG. 2, once each pixel location for each instance of image data 210, 220 is determined to be "well-exposed" or "poorly-exposed" (i.e., for each instance of image data, each pixel location of the respective instance of image data is determined to be associated with a metric value that falls within or outside a certain threshold of the median value for that particular metric), then binary maps 240, 250 are generated for each instance of image data 210, 220. According to an embodiment, each binary map 240, 250 is comprised of either "white binary pixel data" or "black binary pixel data" at each pixel location of the binary map 240, 250. In an embodiment, the pixel locations of the binary maps 240, 250 correspond to the pixel locations of the instances of image data 210, 220 (e.g., a pixel location at a particular (x, y) coordinate in an instance of image data corresponds to the same (x, y) coordinate in the image data's respective binary map). As discussed herein, and according to various embodiments, a pixel location of a binary map being associated with "white binary pixel data" refers to the metric value associated with the corresponding pixel location of the underlying instance of image data being within a certain threshold of the median value for that metric, as determined for the underlying instance of image data (i.e., the difference between the metric value associated with the corresponding pixel location of the underlying instance of image data, and the median value for that metric as determined for the underlying instance of image data, is less than a particular threshold). Similarly, a pixel location of a binary map being associated with "black binary pixel data" refers to the metric value associated with the corresponding pixel location of the underlying instance of image data being outside a certain threshold of the median value for that metric, as determined for the underlying instance of image data (i.e., the difference between the metric value associated with the corresponding pixel location of the underlying instance of image data, and the median value for that metric as determined for the underlying instance of image data, is greater than a particular threshold).

In the example embodiment of FIG. 2, the binary maps 240, 250 are comprised of visible "white binary pixel data" (i.e., white pixels) and visible "black binary pixel data" (i.e., black pixels), although, as discussed herein, any particular color or identifier may be used to distinguish between pixel locations having a metric value inside or outside a certain threshold of the median value for that metric. For the example embodiment of FIG. 2, the white pixels in the binary maps 240, 250 correspond to "well-exposed" pixels and the black pixels in the binary maps 240, 250 correspond to "poorly-exposed" pixels.

In the example embodiment of FIG. 2, the binary maps 240, 250 are then utilized in a quality and alignment determination 260. According to various embodiments, a number of pixel locations in each of the binary maps comprising black binary pixel data is determined (e.g., a "pixel quality threshold" determination), and the number for each binary map is compared to a threshold value. If the number of pixel locations for a particular binary map having black binary pixel data exceeds the threshold value, then the underlying image data is discarded from the enhanced image generation process. For example, an instance of image data may have too many under- or over-exposed pixels to proceed with the enhanced image generation process (various embodiments of which being described fully herein); although as described herein, any image metric able to be determined for an individual pixel location, or group of pixel locations, in an instance of image data may be utilized in the pixel quality threshold determination. The under- or over-exposed pixels of the example embodiment are identified according to the binary map determination process (e.g., assigning black binary pixel data to the pixel locations corresponding to the under- or over-exposed pixels), and any instance of image data having too many "bad quality" pixels is thereby determined unsuitable to utilize in the enhanced image generation process and is discarded. According to various embodiments, an instance of image data may be "discarded" by being deleted, for example from a computing device, or may be removed from any further manipulation or analysis that is related to the enhanced image generation process as described herein.

According to an embodiment, the binary maps 240, 250 may be used to determine whether one or more of the instances of image data 210, 220 cannot be adequately aligned with other instances of image data 210, 220, or contains an excessive amount of blur or motion such that the particular instance of image data is unsuitable to utilize in the enhanced image generation process and may be discarded, as described herein. For example, if there are three instances of image data being used with the techniques described herein to generate an enhanced output image, than one of the instances of image data may be blurry; for example, the camera may have moved during exposure of that particular instance of image data (as also described with regard to FIG. 1), or an object may have been in motion during exposure of the particular instance of image data, but not during the exposure of the other instances of image data (e.g., a fast-moving car or thrown ball in the background of one instance of image data). According to various embodiments, the white binary pixel data of the binary maps may be compared to identify instances of image data that are unsuitable to use in the enhanced image generation process. For example, the binary maps may be overlaid and the areas of white binary pixels compared to determine if they line up. One of the binary maps may have a region of white binary pixel data (e.g., "well-exposed" pixels) that is out of alignment with a corresponding region of white binary pixel data in the other binary maps. This area of misalignment may be analyzed and determined to be within or outside a particular threshold; for example, the (x, y) coordinates of the region of white binary pixel data in the binary map corresponding to the "misaligned" image data may be compared to the (x, y) coordinates of the corresponding region of white binary pixel data in the other binary maps. If the number of (x, y) locations associated with the out of alignment region is outside a certain threshold, or in another embodiment, if the degree or extent of the magnitude of the difference in each respective pixel (x, y) location between the regions of white binary pixel data exceeds a certain threshold, then the "misaligned" image data may be considered too out of alignment to include in the enhanced image generation process (e.g., the misalignment is too great to be compensated for, according to various techniques known in the art) and may be discarded as described elsewhere herein.

In an embodiment, if none of the instances of image data 210, 220 are identified as capable of being aligned without causing excessive artifacts in a final output image, then the process may be terminated and one of the sequence of instances of image data 210, 220 chosen as the final enhanced output image.

Figure 3:
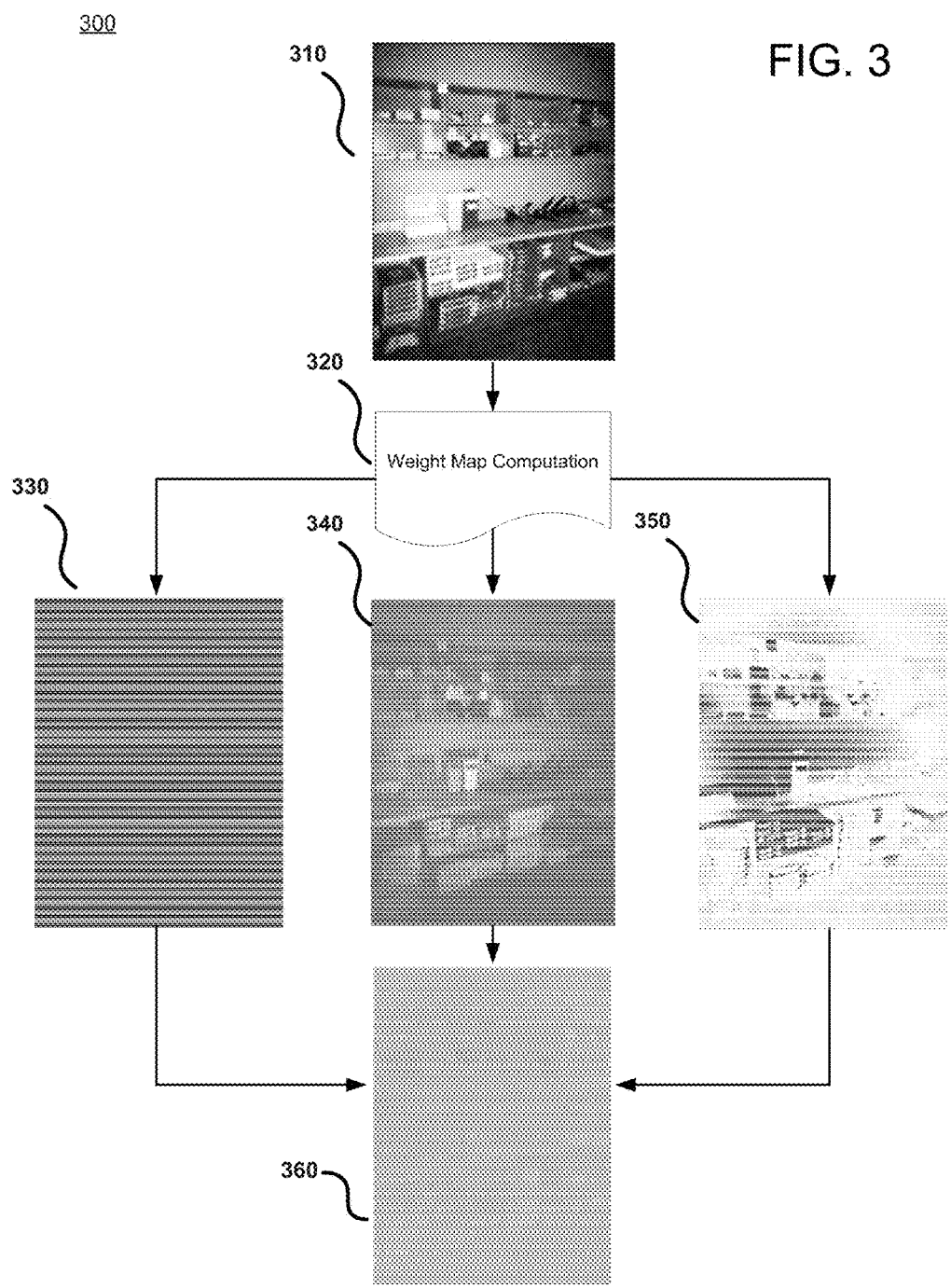
FIG. 3 illustrates an example process for creating weight maps for selected instances of image data in accordance with various embodiments.

FIG. 3 illustrates an example process 300 for creating weight maps for selected instances of image data in accordance with various embodiments. According to an embodiment, weight maps are used to identify and capture "favored parts" of an instance of image data; i.e., portions of an instance of image data that have high quality, as may be measured by various metrics associated with the individual instances of image data of a sequence of instances of image data that may ultimately be merged into a final enhanced output image, according to techniques described herein.

In the example of FIG. 3, an instance of image data 310 has been selected for weight map computation. The instance of image data 310 may be, as previously discussed, one of any number of instances of image data (e.g., one of a 3-shot sequence of image data taken within a few milliseconds) that is to be combined into a final enhanced output image, according to techniques described herein. Instance of image data 310 in the example of FIG. 3 has three color channels: Red, Green, and Blue, which form the well-known RGB color model. For the example equations below, instance of image data 310 is represented by I and its three color channels (red, green, blue) are represented by $I_r$, $I_g$, and $I_b$, respectively.

In order to capture the favored parts of instance of image data 310, image metrics are calculated for each pixel location (x, y) of instance of image data 310, according to various embodiments. In the example of FIG. 3, the image metrics are contrast, saturation, and exposedness; however, it is understood that any number and/or type of image metrics may be utilized in the computation and creation of image weight maps, according to various embodiments. As part of calculating the image metrics for each pixel at each pixel location, a weight map for each metric is generated.

According to an embodiment, the Weight Map Computation 320 analyzes an input instance of image data 310 and determines a weight at each pixel location corresponding to that pixel's value with regard to the image metric being calculated. For example, a pixel location having a higher value for a particular image metric will have a greater weight in that metric's weight map. In an embodiment, the whiter a pixel is in a respective weight map, the more importance associated with the pixel at that pixel location, and the greater the weight that is associated with that pixel location. For example, regions of an image that have higher contrast will be given higher weights and appear whiter than regions with lower contrast, and this would be similar for metric values such as saturation and exposedness. In the example of FIG. 3, three weight maps are computed: contrast 330, saturation 340, and exposedness 350.

Contrast map 330 represents regions of instance of image data 310 that have higher contrast; e.g., a difference between a particular pixel's luminance intensity and the pixel's local average luminance intensity. Pixel locations (or regions, according to various embodiments) identified as having higher contrast receive a greater weight. The following represents a description of an example contrast map computed in accordance with at least one embodiment.

Given a contrast map $I_C$ and pixel locations of input image data (x, y), $$I_C(x, y) = |I_g(x, y) - I_g(x, y) * G(x, y)|$$

$$= \left| I_g(x, y) - \sum_{m=-M}^{M} \sum_{n=-N}^{N} I_g(x-m, y-n) G(m, n) \right|$$

where G represents an M-by-N Gaussian function with zero mean, and a standard deviation equal to σ:

$$G(x, y) = \frac{1}{2\pi\sigma^2} e^{-\frac{x^2+y^2}{2\pi^2}}$$

Saturation map 340 represents regions of instance of image data 310 that have higher saturation values; e.g., a standard deviation among the RGB channels associated with each pixel. If the difference at a pixel location is large, then the color at that pixel may be considered more saturated, in which case that pixel location (or region, according to various embodiments) will receive more weight. The following represents a description of an example saturation map computed in accordance with at least one embodiment.

Given a saturation map $I_S$ and pixel locations of input image data (x, y), $$I_S(x, y) = \sqrt{\frac{(I_r(x, y) - \bar{I}(x, y))^2 + (I_g(x, y) - \bar{I}(x, y))^2 + (I_b(x, y) - \bar{I}(x, y))^2}{3}}$$

where $\bar{I}$ represents the average intensity among the RGB channels of each pixel:

$$\bar{I}(x, y) = \frac{I_r(x, y) + I_g(x, y) + I_b(x, y)}{3}$$

Exposedness map 350 represents regions of instance of image data 310 that have higher exposedness values; e.g., a measure of the difference between the pixel luminance intensity and the median luminance intensity of the entire image 310. If the difference at a pixel location is small, then the pixel at that location may be considered better exposed, in which case that pixel location (or region, according to various embodiments) will receive more weight. The following represents a description of an example exposedness map computed in accordance with at least one embodiment.

Given a exposedness map $I_E$ and pixel locations of input image data (x, y), $$I_E(x, y) = e^{-\frac{(I_g(x,y) - M_g)^2}{c_E^2}}$$

where $M_g$=Median($I_g$) represents the median luminance intensity of the entire image data, and $c_E$ is a constant that can be adjusted.

According to an embodiment, once all weight maps are calculated, a final weight map 360 may be computed that comprises, for each pixel location, a number corresponding to a weight for that pixel location. That weight may be considered as how important that particular pixel is with regard to its quality. For example, a particular pixel location that is calculated, through the example equations above, to have higher values for contrast, saturation, and exposedness, may be considered to be a "better" pixel in terms of image quality, and will receive a higher weight in the techniques described herein. Given values at each pixel location in the three weight maps 330-350 in the example of FIG. 3, a normalization procedure provides the final weight for a given pixel location, according to an embodiment. The following represents a description of an example final weight map 360 computed in accordance with at least one embodiment. For example, given a final weight map W, $$W(x,y) = (I_C(x,y))^{w_C} \cdot (I_S(x,y))^{w_S} \cdot (I_E(x,y))^{w_E}$$

where $w_C$, $w_S$, and $W_E$ are constants that may be adjusted according to various embodiments.

Figure 4:
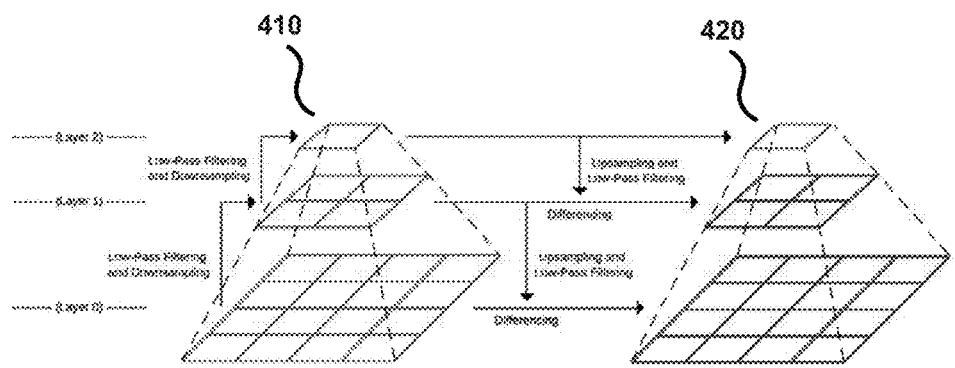
FIG. 4 illustrates example Gaussian and Laplacian pyramids that can be generated in accordance with various embodiments.

FIG. 4 illustrates example Gaussian and Laplacian pyramid generation techniques that can be utilized in accordance with various embodiments. An image pyramid is known in the art as a collection of image data, based on a single original image data. Image pyramids allow for many advantages, including minimizing artifacts along image data boundaries and edges when combining multiple instances of image data. The original image data is successively down-sampled (in the case of Gaussian pyramids) or upsampled (in the case of Laplacian pyramids). Gaussian pyramids are often used to decompose images into image information at multiple scales, which can be useful in extracting features of the image data, for example. Laplacian pyramids utilize a Laplacian transform to decompose an original image data into a hierarchy of instances of image data, with each level of the pyramid corresponding to varying frequency bands of the image data. According to various embodiments, instances of image data in a sequence of instances of image data desired to be merged according to techniques described herein each are decomposed into a Laplacian pyramid, while the image data's corresponding weight maps each are decomposed into a Gaussian pyramid. As will be described more fully herein, the resulting pyramids are then combined into a Laplacian pyramid and the final output enhanced image is generated by collapsing the combined Laplacian pyramid.

In the example of FIG. 4, a Gaussian pyramid 410 is illustrated, comprising three layers. Layer 0 is the base layer, comprising an original image data. Layer 1 is formed by utilizing a low-pass filter and down-sampling the image data (e.g., resizing the image data). Layer 2 likewise is formed by utilizing a low-pass filter and down-sampling the image data existing at Layer 1. An image pyramid may comprise any number of layers.

The following example of forming a Gaussian pyramid 410 represents a description of an example Gaussian pyramid computed from an original image I (at layer 0) in accordance with at least one embodiment. For example, given an image I, its Gaussian image pyramid at layer i, $G^{(i)}\{I\}$ is formed by low-pass filtering layer i-1, $G^{(i-1)}\{I\}$ with a Gaussian function and then down-sampling the image I:

$$G^{(i)}\{I(x,y)\} = \hat{G}^{(i-1)}\{I(2x, 2y)\}$$

where $\hat{G}^{(i-1)}\{I\}$ is the low-pass filtered layer i−1 given by:

$$\hat{\mathcal{G}}^{(i-1)}\{I(x,y)\} = \mathcal{G}^{(i-1)}\{I(x,y)\} * G(x,y)$$

$$= \sum_{m=-M}^{M} \sum_{n=-N}^{N} \mathcal{G}^{(i-1)}\{I(x-m, y-n)\}G(m,n)$$

where G represents a M by N Gaussian function.

In the example of FIG. 4, a Laplacian pyramid 420 is illustrated, comprising three layers. In various embodiments, Laplacian pyramid 420 is formed based on Gaussian pyramid 410. Layer 2 is the top layer, equal to its highest corresponding Gaussian pyramid layer. Each intermediate layer is formed by up-sampling the image (e.g., resizing the image), utilizing a low-pass Gaussian filter and subtracting (differencing) the result from its Gaussian pyramid layer i, as shown below.

The following example of forming a Laplacian pyramid 420 represents a description of an example Laplacian pyramid computed from a corresponding Gaussian pyramid in accordance with at least one embodiment. For example, given an image I, its Laplacian image pyramid at layer i, $L^{(i)}\{I\}$ is formed by up-sampling its Gaussian pyramid layer i+1, then low-pass filtering it with a Gaussian function, and subtracting the result from its Gaussian pyramid layer i, such as:

$$L^{(i)}\{I(x,y)\} = G^{(i)}\{I(x,y)\} - \hat{G}'^{(i+1)}\{I(x,y)\}$$

where $\hat{G}'^{(i+1)}\{I\}$ is the low-pass filtered, up-sampled Gaussian pyramid layer i+1 given by:

$$\hat{\mathcal{G}}'^{(i+1)}\{I(x,y)\} = \mathcal{G}'^{(i+1)}\{I(x,y)\} * (4 \cdot G(x,y))$$

$$= \sum_{m=-M}^{M} \sum_{n=-N}^{N} \mathcal{G}'^{(i+1)}\{I(x-m, y-n)\}(4 \cdot G(m,n))$$

where G represents a M by N Gaussian function, and $\hat{G}'^{(I+1)}\{i\}$ is the up-sampled Gaussian pyramid layer i+1 given by:

$$\mathcal{G}'^{(i+1)}\{I(x,y)\} = \begin{cases} \mathcal{G}^{(i+1)}\{I(\frac{x}{2},\frac{y}{2})\}, & x \text{ and } y \text{ are both even} \\ 0, & \text{otherwise} \end{cases}$$

Figure 5:
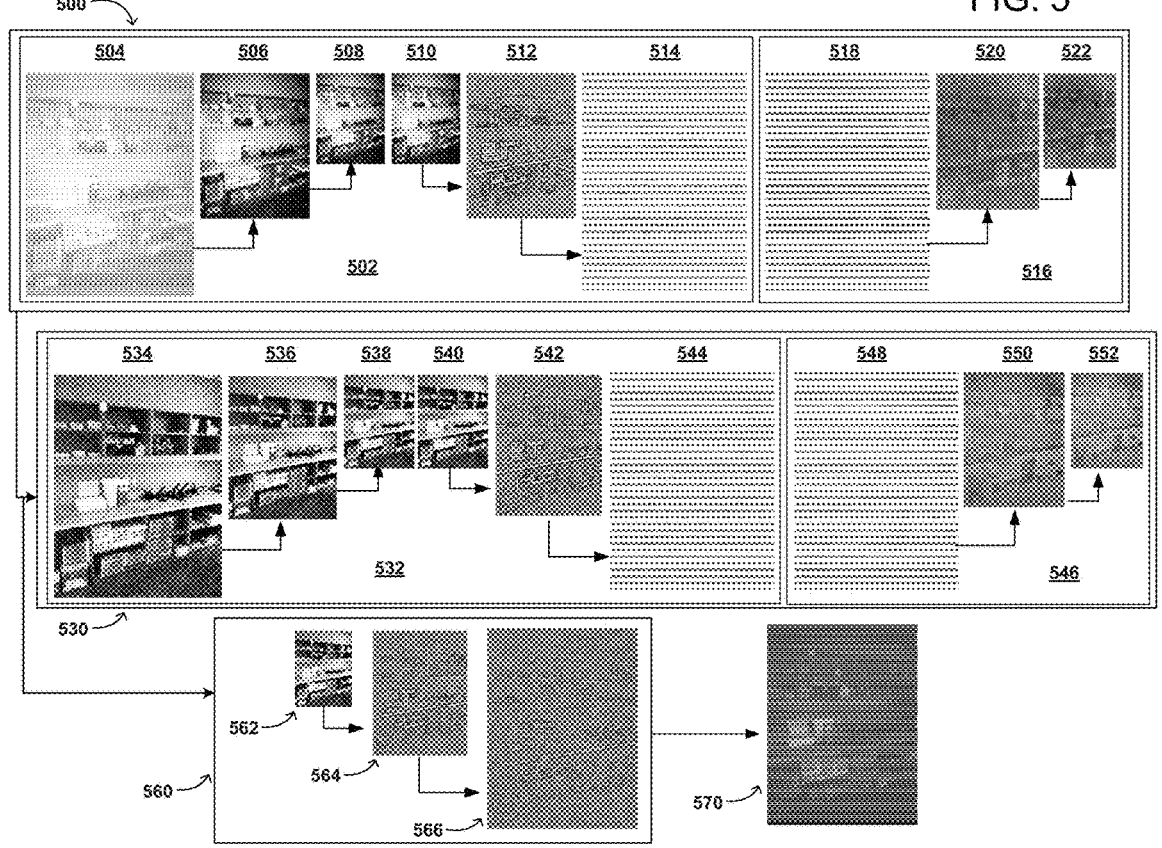
FIG. 5 illustrates example pyramid blending techniques that can be utilized in accordance with various embodiments.

FIG. 5 illustrates example pyramid blending techniques that can be utilized in accordance with various embodiments. In various embodiments, multiple instances of image data are fused/blended/merged with their corresponding weight maps, the weight maps being discussed herein with respect to FIG. 3. In an embodiment, a Gaussian pyramid of an image's corresponding weight map is generated, along with a Laplacian pyramid of the image data. This is repeated for each instance of image data in a set of instances of image data selected to be merged together into an enhanced output image. Once each image data in the set and its corresponding weight map has been decomposed into the Laplacian and Gaussian pyramids, respectively, then a weighted sum at each layer is computed, resulting in a single Lapalacian pyramid of the enhanced output image, which is then generated by collapsing the Laplacian pyramid.

In the example of FIG. 5, there are two instances of image data 500, 530 that have been selected for merging. For example, an image capture element of a computing device has captured the two instances of image data 500, 530 of a scene in rapid succession. These pictures are then processed according to techniques described herein in order to create an enhanced output image that comprises optimal aspects of each instance of image data. Accordingly, in the example of FIG. 5, the first image 500 has a Gaussian pyramid of its corresponding weight map 516 formed. In the example of FIG. 5, the Gaussian pyramid of its corresponding weight map 516 has 3 levels: the base layer 518, a second layer 520, and a top layer 522, formed according to techniques described above. A Gaussian and Laplacian pyramid is then formed 502 of the first instance of image data 500. A Gaussian pyramid of the instance of image data 500 is determined, comprising a base layer 504, a second layer 506, and a top layer 508. A Laplacian pyramid of the instance of image data 500 is then determined, comprised of corresponding layers to the Gaussian pyramid: a top layer 510, a second layer 512, and a base layer 514.

A second instance of image data 530 in the set is then processed similarly. A Gaussian pyramid of the weight map 546 corresponding to the second instance of image data 530 is formed having a base layer 548, a second layer 550, and a top layer 552. A Gaussian and Laplacian pyramid is then formed 532 of the second instance of image data 530. A Gaussian pyramid of the instance of image data 530 is determined, comprising a base layer 534, a second layer 536, and a top layer 538. A Laplacian pyramid of the second instance of image data 530 is generated, comprised of corresponding layers to the Gaussian pyramid: a top layer 540, a second layer 542, and a base layer 544.

The Gaussian pyramid of the weight maps of the first instance of image data 500 and the Laplacian pyramid of the first instance of image data 500 are then merged with the Gaussian pyramid of the weight maps of the second instance of image data 530 and the Laplacian pyramid of the second instance of image data 530, for example by computing a weighted sum at each layer of the Laplacian pyramid for each image based on the Gaussian pyramids of the corresponding weight maps 516, 546.

The resulting merged Laplacian pyramid 560 comprises a top layer 562, a second layer 564, and a base layer 566 reflecting the corresponding weighted Laplacian pyramid layers of the first instance of image data 500 and second instance of image data 530. To obtain the enhanced output image 570, the merged Laplacian pyramid 560 is collapsed, for example by upsampling the top merged layer 562 and upsampling the second merged layer 564.

For example, given the two instances of image data 500, 530 of the example of FIG. 5 ($I_1$ and $I_2$) and their corresponding weight maps $W_1$ and $W_2$, the Laplacian pyramid of the enhanced output image $L\{\tilde{I}\}$ is obtained by fusing/blending/merging the Laplacian pyramid of the images ($I_1$, $I_2$) and the Gaussian pyramid of the corresponding weight maps at each layer, such as:

$$L^{(i)}\{\tilde{I}(x,y)\} = \frac{\mathcal{G}^{(i)}\{W_1(x,y)\}}{\mathcal{G}^{(i)}\{W_1(x,y)\} + \mathcal{G}^{(i)}\{W_2(x,y)\}} L^{(i)}\{I_1(x,y)\} + \frac{\mathcal{G}^{(i)}\{W_2(x,y)\}}{\mathcal{G}^{(i)}\{W_1(x,y)\} + \mathcal{G}^{(i)}\{W_2(x,y)\}} L^{(i)}\{I_2(x,y)\}$$

which can be generalized to be applicable to multiple (e.g., N) images via:

$$\mathcal{L}^{(i)}\{\tilde{I}(x, y)\} = \sum_{n=0}^{N-1} \frac{\mathcal{G}^{(i)}\{W_n(x, y)\}}{\sum_{m=0}^{N-1} \mathcal{G}^{(i)}\{W_m(x, y)\}} \mathcal{L}^{(i)}\{I_n(x, y)\}$$

Figure 6:
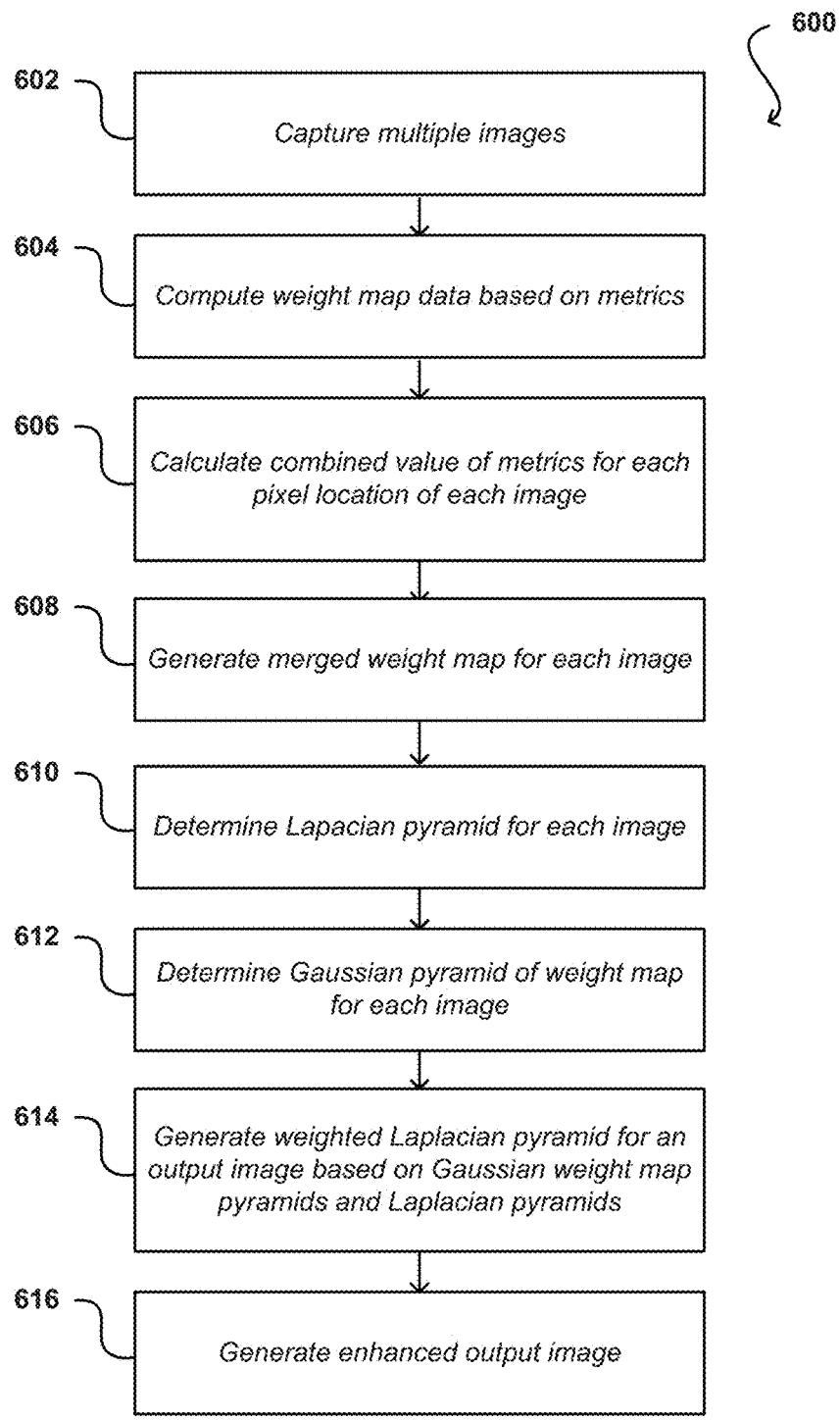
FIG. 6 illustrates an example process for generating an enhanced output image from multiple instances of input image data, in accordance with various embodiments.

FIG. 6 illustrates an example process 600 for generating an enhanced output image that can be utilized in accordance with various embodiments. It should be understood that for this and other processes discussed and suggested herein there can be additional, fewer, or alternative steps, performed in similar or different orders, or in parallel, within the scope of the various embodiments. In this example, multiple instances of image data are captured 602, for example with an image capture element of a digital camera device that is incorporated into a mobile phone, tablet computing device, laptop, or other device. The instances of image data may be captured as part of a succession of instances of image data captured within a few milliseconds by the image capture element, or may be individual digital images, for example stored in separate digital files. According to an embodiment, at least one of the instances of image data is captured with a different setting associated with the camera than the other instances of image data; e.g., one picture is taken without a flash being illuminated while one or more other pictures are taken with a flash. The setting may also comprise properties associated with the image data capture, such as exposure time, shutter speed, etc.

For each of the captured instances of image data, weight map data is computed 604. According to an embodiment, weight map data is computed for one or more metrics (or "qualities") associated with the pixels comprising the instances of image data; e.g., saturation level, contrast level, exposedness level, etc. For example, the weight map data comprises values for the selected metric that are associated with each pixel (at a pixel location) in the image data. Any type of metric or property associated with a pixel may be utilized to compute the weight map data. According to various embodiments, one set of weight map data is computed for each selected pixel property (e.g., one for saturation, one for contrast, etc.), and this collection of sets of weight map data is computed for each instance of image data in the set of instances of image data to be processed into a final enhanced output image.

Once the collection of weight map data is generated, a "combined value" for each pixel location in each of the instances of image data in the set of instances of image data is calculated 606. For example, a pixel location in the selected instance of image data may have any number of values associated with it, each value based on a different metric of the pixel at that location. Each value for a pixel location is combined together through a normalization or averaging process to result in a single value for the pixel location, the single value indicating a level of quality for that particular pixel location. In various embodiments, regions of pixels are used instead of or along with individual pixel locations in this process. As a result of this process, a merged weight map for each instance of image data is created 608 based on all the metric values associated with each individual pixel location. In this manner, the "favored parts" of each instance of image data may be given greater weight in the final enhanced output image. For example, in the case of three instances of image data in the set of instances of image data to be processed, if pixel location A in the first instance of image data has a higher combined value than pixel location A in the second and third instances of image data, then the merged weight map for the first instance of image data will reflect this higher value, and pixel location A in the final enhanced output image will reflect more of the qualities of pixel location A in the first instance of image data (i.e., the instance of image data with the greatest weight at pixel location A).

Once the weight map generation is complete, a Laplacian pyramid for each of the instances of image data is generated 610. In some embodiments, this may include generating a Gaussian pyramid of each instance of image data and then generating the Laplacian pyramid for each instance of image data based on the Gaussian pyramid, where each of the Gaussian and Laplacian pyramids have a certain number of levels, e.g., from 2 to N. For example, each of the Gaussian and Laplacian pyramids may comprise an equal number of levels, each level associated with a different resolution or size of the instance of image data (e.g., due to the down-sampling and up-sampling). Once the Laplacian pyramid for each instance of image data is generated, a Gaussian pyramid of each "merged" or "combined" weight map (as described above) is generated 612. This Gaussian pyramid of the combined weight maps for each instance of image data is used to blend each layer of the Laplacian pyramid for each instance of image data together at different resolutions for each level of the pyramid (e.g., from large to small, coarse to fine resolutions at different scales).

Once the Gaussian pyramid of the combined weight maps for each instance of image data and the Laplacian pyramid for each instance of image data is generated, a "weighted" Laplacian pyramid is generated 614 for the final enhanced output image. By merging a Gaussian pyramid of the weight map for each instance of image data with the Laplacian pyramid for each instance of image data, artifacts in a final enhanced output image may be minimized, especially at seams within the combined image. This process allows for seamless blending of multiple instances of image data. According to various embodiments, the weighted Laplacian pyramid is generated based on a weighted sum of each layer of the Gaussian pyramid of each instance of image data being merged with the Laplacian pyramid of the respective layer of each instance of image data. As described herein, the weight map for each instance of image data describes a weight for each pixel location of the instance of image data. Based on these weights and the Laplacian pyramid for the corresponding instance of image data, each level of the pyramids may be fused/blended/merged with the weight values so that the "favored" aspects of each instance of image data are preserved throughout the pyramid blending process.

When instances of image data are fused/blended, regions of the instances of image data may have a level of under-exposedness in some areas and over-exposedness in others. For example, an object in an image may not be well-lit (underexposedness) in a picture taken without a flash, but once the flash is illuminated and another picture taken, the object is over-lit (over-exposedness). According to various embodiments, a median exposedness value may be determined for each image in the set, and for each pixel location in each image, its exposedness value is compared to the median value for the corresponding image to determine a level of over- or under-exposedness for that particular pixel location under different illumination circumstances, as described herein. A final enhanced output image may then be generated 616 by collapsing the "weighted" Laplacian pyramid, for example according to methods known in the art.

Figure 7:
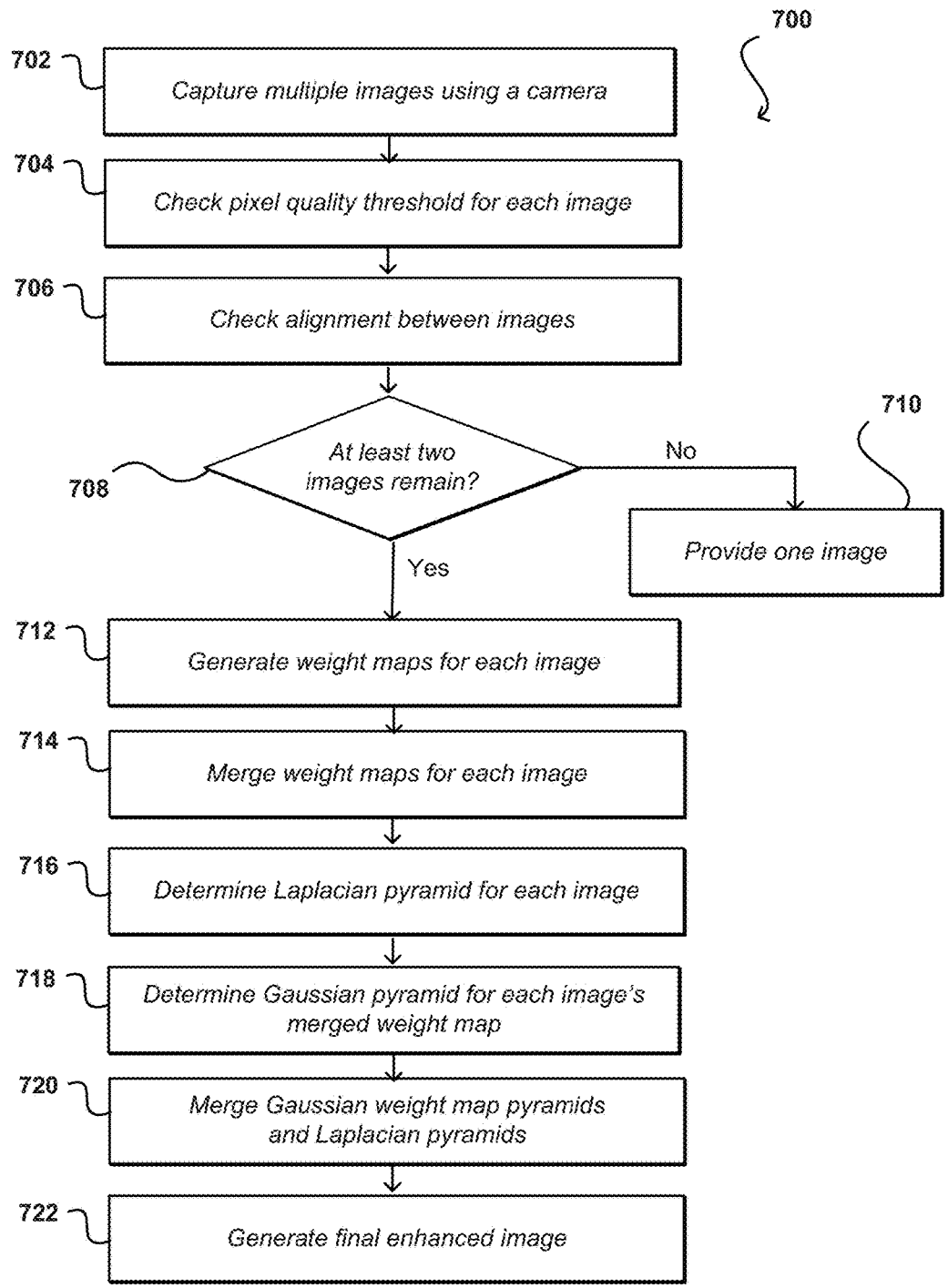
FIG. 7 illustrates an example process for generating an enhanced output image from multiple instances of input image data, in accordance with various embodiments.

FIG. 7 illustrates another example process 700 for generating an enhanced output image that can be utilized in accordance with various embodiments. In this example, multiple instances of image data are captured 702 using an image capture element, for example of a computing device. The pixel quality threshold for each instance of image data is checked 704. According to an embodiment, and as described earlier, a binary map is generated for each instance of image data. To check for pixel quality, in an embodiment, the number of pixel locations associated with black binary pixel data in the binary maps corresponding to each instance of image data are determined. If, for a particular binary map, the number of pixel locations associated with black binary pixel data exceed a certain threshold value, then the corresponding instance of image data may be considered of poor quality and discarded from the example process of FIG. 7. The alignment between the remaining instances of image data is then checked 706 to determine if the image enhancement process will introduce unwanted artifacts into the final enhanced output image, for example because of blur in one or more of the images, or motion of an object in one or more of the images. According to an embodiment, and as described earlier, the white binary pixel data of the binary maps for each remaining instance of image data are aligned, and a determination is made based on a threshold range of alignment whether any of the instances of image data are incapable of being merged, for example because of blur or motion that would cause the misalignment identified by the comparison of the white binary pixel data of the binary maps.

According to an embodiment, once all the images in the set have been checked for pixel quality and alignment issues, a determination is made 708 whether more than one instance of image data remains. If only one instance of image data remains, then that instance of image data is chosen and provided as the "best" instance of image data, and the process terminates 710. If no instance of image data remains, then one of the instances of image data may be selected using various criteria, or no instance of image data may be selected, and an indication provided to a user that the process cannot be completed.

Should two or more instances of image data remain to be processed, a plurality of weight maps are generated for each instance of image data 712, as described above. According to various embodiments, metrics associated with each pixel location of each instance of image data are used to generate weight maps for each instance of image data, each weight map corresponding to a particular metric. The weight maps for each instance of image data are then merged 714, for example using a normalizing or averaging/weighting process as discussed herein. Each instance of image data is then decomposed 716 into a Laplacian pyramid, and each merged weight map corresponding to each instance of image data is decomposed 718 into a Gaussian pyramid. The Gaussian weight map and Lapacian pyramid for each instance of image data in the set are merged together 720, for example into a Laplacian pyramid that is generated based on the Laplacian pyramid for each instance of image data with the weight values provided by the Gaussian pyramid incorporated into each level of the pyramid. A final enhanced output image is then generated 722 by collapsing the merged Laplacian pyramid. According to various embodiments, one or more of the steps discussed with regard to FIGS. 6 and/or 7 may be performed in a camera module of a computing device, or may be performed remotely, for example by transmitting images over a network to a server for processing, with a final enhanced output image being delivered over a network to a computing device.

Figure 8:
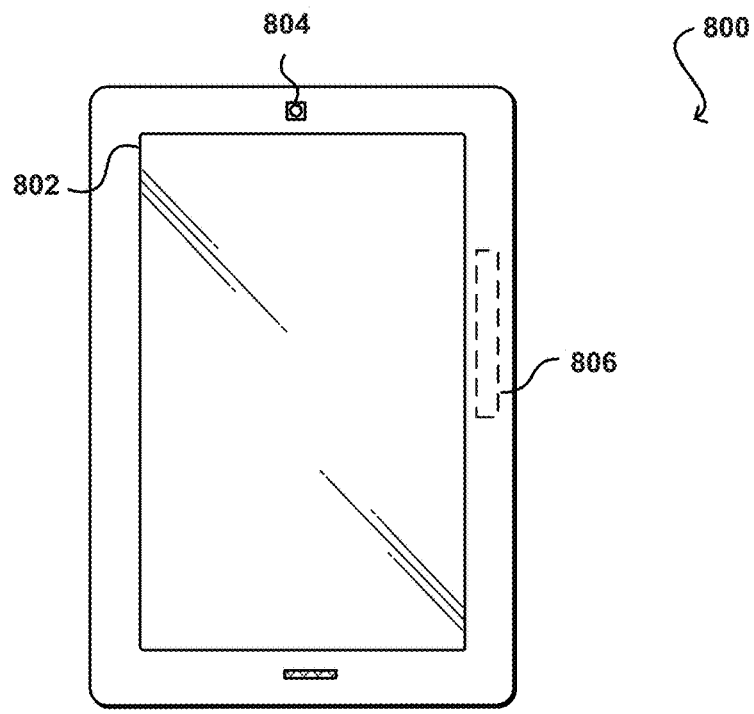
FIG. 8 illustrates an example device that can be used to implement aspects of the various embodiments.

FIG. 8 illustrates an example electronic user device 800 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 800 has a display screen 802 on the front side, which under normal operation will display information to a user facing the display screen (e.g., on the same side of the computing device as the display screen). The computing device in this example includes at least one image capture element 804 or other imaging element for capturing still or video image information over at least a field of view of the at least one image capture element. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the image capture element to capture images over a wide range of angles, such as 180 degrees or more. Further, each image capture element can comprise a digital still camera, configured to capture subsequent frames in rapid succession, or a video camera able to capture streaming video.

The example computing device 800 also includes at least one microphone or other audio capture device capable of capturing audio data, such as words or commands spoken by a user of the device. In this example, a microphone is placed on the same side of the device as the display screen 902, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 800 also includes at least one orientation sensor 808, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 9:
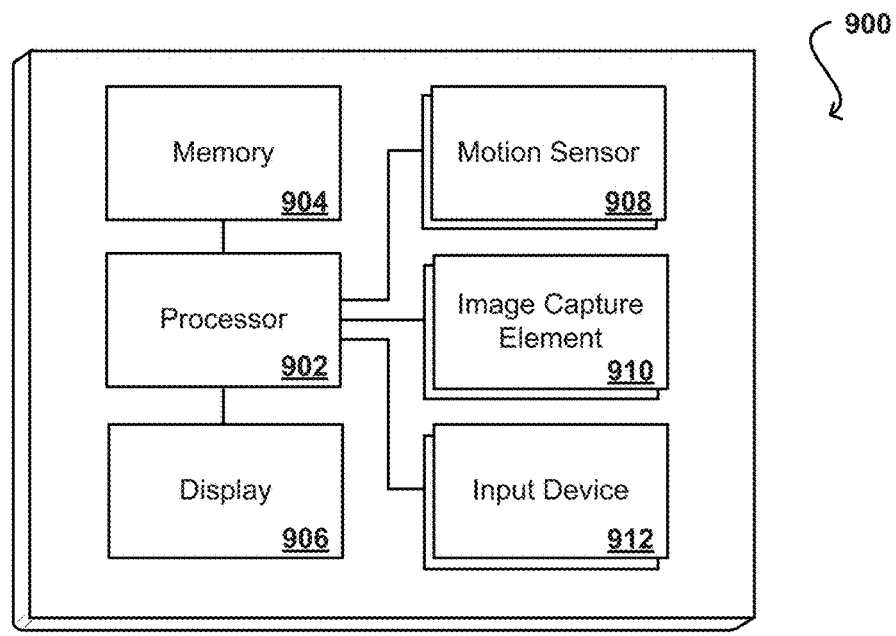
FIG. 9 illustrates example components of an example device such as that illustrated in FIG. 8.

FIG. 9 illustrates a logical arrangement of a set of general components of an example computing device 900 such as the device 800 described with respect to FIG. 8. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one image capture element such as a camera 910 or infrared sensor that is able to image projected images or other objects in the vicinity of the device. Methods for capturing images or video using an image capture element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component, such as a mono or stereo microphone or microphone array, operable to capture audio information from at least one primary direction. A microphone can be a uni- or omni-directional microphone as known for such devices.

In some embodiments, the computing device 900 of FIG. 9 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device 912 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 900 also can include at least one orientation or motion sensor 908. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 902, whereby the device can perform any of a number of actions described or suggested herein.

As an example, a computing device such as that described with respect to FIG. 8 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    capturing first image data using an image capture element of a computing device;
    capturing second image data while an illumination element of the computing device is activated;
    generating first weight map data associated with the first image data, the first weight map data comprising a saturation value computed for a first pixel location in the first image data;
    generating second weight map data associated with the first image data, the second weight map data comprising a contrast value computed for the first pixel location in the first image data;
    generating third weight map data associated with the first image data, the third weight map data comprising an exposedness value computed for the first pixel location in the first image data;
    calculating a first combined value for the first pixel location in the first image data, the first combined value being based upon a normalization of the saturation value, the contrast value, and the exposedness value computed for the first pixel location in the first image data;
    generating a first merged weight map associated with the first image data, the first pixel location of the first merged weight map being associated with the combined value for the first pixel location in the first image data;
    generating fourth weight map data associated with the second image data, the fourth weight map data comprising a saturation value computed for a second pixel location in the second image data;
    generating fifth weight map data associated with the second image data, the fifth weight map data comprising a contrast value computed for the second pixel location in the second image data;
    generating sixth weight map data associated with the second image data, the sixth weight map data comprising an exposedness value computed for the second pixel location in the second image data;
    calculating a second combined value for the second pixel location in the second image data, the second combined value being based upon a normalization of the saturation value, the contrast value, and the exposedness value computed for the second pixel location in the second image data;
    generating a second merged weight map associated with the second image data, the second pixel location of the second merged weight map being associated with the second combined value;
    determining a first Laplacian pyramid of the first image data;
    determining a first merged Gaussian pyramid of the first merged weight map associated with the first image data;
    determining a second Laplacian pyramid of the second image data;

determining a second merged Gaussian pyramid associated with the second image data;
determining a weighted Laplacian pyramid for an output image, the weighted Laplacian pyramid being based on a weighted sum of each layer of the first merged Gaussian pyramid and the second merged Gaussian pyramid with each corresponding layer of the first Laplacian pyramid and the second Laplacian pyramid; and
generating the output image by collapsing the weighted Laplacian pyramid.

2. The computing method of claim 1, further comprising:
determining a first median exposedness value of all exposedness values computed for pixel locations associated with the first image data;
determining a second median exposedness value of all exposedness values computed for pixel locations associated with the second image data;
determining that a third pixel location of the first image data corresponds to a first exposedness value, wherein a difference between the first exposedness value and the first median exposedness value is within a threshold range;
determining that a fourth pixel location of the first image data corresponds to a second exposedness value, wherein a difference between the second exposedness value and the first median exposedness value is outside the threshold range;
determining that a fifth pixel location of the second image data corresponds to a third exposedness value, wherein a difference between the third exposedness value and the second median exposedness value is within the threshold range;
determining that a sixth pixel location of the second image data corresponds to a fourth exposedness value, wherein a difference between the fourth exposedness value and the second median exposedness value is outside the threshold range;
generating a first binary map associated with the first image data, the first binary map comprising white binary pixel data and black binary pixel data, the white binary pixel data associated with pixel locations of the first image data corresponding to differences between exposedness values associated with pixel locations of the first image data and the first median exposedness value that are within the threshold range and the black binary pixel data corresponding to differences between exposedness values associated with pixel locations of the first image data and the first median exposedness value that are outside the threshold range; and
generating a second binary map associated with the second image data, the second binary map comprising white binary pixel data and black binary pixel data, the white binary pixel data associated with pixel locations of the second image data corresponding to differences between exposedness values associated with pixel locations of the second image data and the second median exposedness value that are within the threshold range and the black binary pixel data corresponding to differences between exposedness values associated with pixel locations of the second image data and the second median exposedness value that are outside the threshold range.

3. The computing method of claim 2, further comprising:
capturing third image data using the image capture element of the computing device;
determining a third median exposedness value of all exposedness values computed for pixel locations associated with the third image data;
generating a third binary map associated with the third image data, the third binary map comprising white binary pixel data and black binary pixel data, the white pixel data associated with pixel locations of the third image data corresponding to differences between exposedness values associated with pixel locations of the third image data and the third median exposedness value that are within the threshold range and the black binary pixel data corresponding to differences between exposedness values associated with pixel locations of the third image data and the third median exposedness value that are outside the threshold range;
determining, for the first binary map, a first set of pixel locations corresponding to the white binary pixel data of the first binary map;
determining, for the second binary map, a second set of pixel locations corresponding to the white binary pixel data of the second binary map;
determining, for the third binary map, a third set of pixel locations corresponding to the white binary pixel data of the third binary map;
determining an alignment between the first set of pixel locations, the second set of pixel locations, and the third set of pixel locations;
determining that the third set of pixel locations is outside a threshold range of alignment with the first set of pixel locations and the second set of pixel locations; and
discarding the third image data.

4. The computing method of claim 2, further comprising:
capturing third image data using the image capture element of the computing device;
generating a third binary map associated with the third image data, the third binary map comprising white binary pixel data and black binary pixel data, the white pixel data associated with pixel locations of the third image data corresponding to exposedness values within the threshold range and the black pixel data corresponding to exposedness values outside the threshold range;
determining that an amount of black pixel data in the first binary map and the second binary map is within a threshold value;
determining that an amount of black pixel data in the third binary map exceeds the threshold value; and
discarding the third image data.

5. A computer-implemented method, comprising:
capturing first image data using an image capture element of a computing device;
capturing second image data using the image capture element;
generating a first plurality of weight maps for the first image data;
generating a second plurality of weight maps for the second image data;
generating a first merged weight map based at least in part on the first plurality of weight maps;
generating a second merged weight map based at least in part on the second plurality of weight maps;
determining a first Laplacian pyramid based at least in part on the first image data;
determining a second Laplacian pyramid based at least in part on the second image data;
determining a first Gaussian pyramid based at least in part on the first merged weight map;

determining a second Gaussian pyramid based at least in part on the second merged weight map; and generating an output image based at least on part on the first Laplacian pyramid, the first Gaussian pyramid, the second Laplacian pyramid and the second Gaussian pyramid.

6. The computer-implemented method of claim 5, wherein generating the first plurality of weight maps for the first image data and generating the second plurality of weight maps for the second image data further comprises:

determining a first value for a first pixel location of the first image data, the first value corresponding to a first image metric;

determining a second value for the first pixel location of the first image data, the second value corresponding to a second image metric;

determining a third value for a second pixel location of the second image data, the third value corresponding to the first image metric;

determining a fourth value for the second pixel location of the second image data, the fourth value corresponding to the second image metric;

generating a first weight map and second weight map, comprising the first plurality of weight maps, the first weight map of the first plurality of weight maps based at least in part on the first value for the first pixel location of the first image data, and the second weight map of the first plurality of weight maps based at least in part on the second value for the first pixel location of the first image data; and generating a third weight map and fourth weight map, comprising the second plurality of weight maps, the third weight map of the second plurality of weight maps based at least in part on the third value for the second pixel location of the second image data, and the fourth weight map of the second plurality of weight maps based at least in part on the fourth value for the second pixel location of the second image data.

7. The computer-implemented method of claim 6, wherein the first metric and second metric separately correspond to one of contrast, saturation, or exposedness.

8. The computer-implemented method of claim 6, wherein merging the first plurality of weight maps into the first merged weight map and the second plurality of weight maps into the second merged weight map further comprises:

determining, for the first pixel location of the first image data, a first sum of the first value corresponding to the first metric and the second value corresponding to the second metric;

determining, for the second pixel location of the second image data, a second sum of the third value corresponding to the first metric and the fourth value corresponding to the second metric;

determining a first weighted average value for the first pixel location of the first image data, based at least in part on the first value corresponding to the first metric, the second value corresponding to the second metric, and the first sum;

determining a second weighted average value for the second pixel location of the second image data, based at least in part on the third value corresponding to the first metric, the fourth value corresponding to the second metric, and the second sum;

generating the first merged weight map by assigning the first weighted average value to the first pixel location of the first merged weight map; and generating the second merged weight map by assigning the second weighted average value to the second pixel location of the second merged weight map.

9. The computer-implemented method of claim 5, wherein the first image data and the second image data are captured as part of an image capture sequence initiated upon receiving input operable to capture an image; and wherein the first image data and the second image data are captured within a predetermined number of milliseconds.

10. The computer-implemented method of claim 5, further comprising:

determining a first median image metric value associated with the first image data, the first median image metric value corresponding to an image metric;

determining a second median image metric value associated with the second image data, the second median image metric value corresponding to the image metric;

determining, for a first pixel location of the first image data, a first difference between the first median image metric value and a first image metric value associated with the first pixel location;

determining, for a second pixel location of the second image data, a second difference between the second median image metric value and a second image metric value associated with the second pixel location;

generating a first binary map associated with the first image data, the first binary map comprising white binary pixel data and black binary pixel data, the white binary pixel data associated with pixel locations of the first image data wherein the first difference is less than a threshold amount and the black binary pixel data associated with pixel locations of the first image data wherein the first difference is greater than a threshold amount; and generating a second binary map associated with the second image data, the second binary map comprising white binary pixel data and black binary pixel data, the white binary pixel data associated with pixel locations of the second image data wherein the second difference is less than a threshold amount and the black binary pixel data associated with pixel locations of the second image data wherein the second difference is greater than a threshold amount.

11. The computer-implemented method of claim 5, further comprising:

capturing third image data using the image capture element;

determining a third median image metric value associated with the third image data, the third median image metric value corresponding to the image metric;

determining, for a third pixel location of the third image data, a third difference between the third median image metric value and a third image metric value associated with the second pixel location;

generating a third binary map associated with the third image data, the third binary map comprising white binary pixel data and black binary pixel data, the white binary pixel data associated with pixel locations of the third image data wherein the third difference is less than a threshold amount and the black binary pixel data associated with pixel locations of the third image data wherein the third difference is greater than a threshold amount;

comparing the respective pixel locations associated with the white binary pixel data of the first, second, and third binary maps;

determining, based at least in part on the comparison, that the third image data is outside a threshold range of alignment with the first image data and the second image data; and discarding the third image data.

12. The computer-implemented method of claim 5, further comprising:

capturing third image data using the image capture element;

determining a third median image metric value associated with the third image data, the third median image metric value corresponding to the image metric;

determining, for a third pixel location of the third image data, a third difference between the third median image metric value and a third image metric value associated with the second pixel location;

generating a third binary map associated with the third image data, the third binary map comprising white binary pixel data and black binary pixel data, the white binary pixel data associated with pixel locations of the third image data wherein the third difference is less than a threshold amount and the black binary pixel data associated with pixel locations of the third image data wherein the third difference is greater than a threshold amount;

determining that an amount of black pixel data in the third binary map exceeds a threshold value; and discarding the third image data.

13. The computer-implemented method of claim 5, wherein the first image data and second image data are captured using different values associated with one of one or more settings associated with the image capture element of the computing device; and wherein the one or more settings each correspond to one of exposure time, focal length, illumination element activation, shutter speed, aperture, white balance, shooting mode, exposure bracketing, focus mode, or ISO setting.

14. The computer-implemented method of claim 5, wherein at least the first image data comprises a frame of video captured by the image capture element of the computing device.

15. A computing device, comprising:

at least one processor;

an image capture element; and memory including instructions that, when executed by the at least one processor of the computing device, cause the computing device to:

capture first image data using the image capture element of a computing device;

capture second image data using the image capture element;

generate a first plurality of weight maps for the first image data;

generate a second plurality of weight maps for the second image data;

generate a first merged weight map based at least in part on the first plurality of weight maps;

generate a second merged weight map based at least in part on the second plurality of weight maps;

determine a first Laplacian pyramid based at least in part on the first image data;

determine a second Laplacian pyramid based at least in part on the second image data;

determine a first Gaussian pyramid based at least in part on the first merged weight map;

determine a second Gaussian pyramid based at least in part on the second merged weight map; and generate an output image based at least in part on the first Laplacian pyramid, the first Gaussian pyramid, the second Laplacian pyramid, and the second Gaussian pyramid.

16. The computing device of claim 15, wherein the instructions when executed further cause the computing device to:

determine a first value for a first pixel location of the first image data, the first value corresponding to a first image metric;

determine a second value for the first pixel location of the first image data, the second value corresponding to a second image metric;

determine a third value for a second pixel location of the second image data, the third value corresponding to the first image metric;

determine a fourth value for the second pixel location of the second image data, the fourth value corresponding to the second image metric;

generate a first weight map and second weight map, comprising the first plurality of weight maps, the first weight map of the first plurality of weight maps based at least in part on the first value for the first pixel location of the first image data, and the second weight map of the first plurality of weight maps based at least in part on the second value for the first pixel location of the first image data; and generate a third weight map and fourth weight map, comprising the second plurality of weight maps, the third weight map of the second plurality of weight maps based at least in part on the third value for the second pixel location of the second image data, and the fourth weight map of the second plurality of weight maps based at least in part on the fourth value for the second pixel location of the second image data.

17. The computing device of claim 16, wherein the instructions when executed further cause the computing device to:

determine, for the first pixel location of the first image data, a first sum of the first value corresponding to the first metric and the second value corresponding to the second metric;

determine, for the second pixel location of the second image data, a second sum of the third value corresponding to the first metric and the fourth value corresponding to the second metric;

determine a first weighted average value for the first pixel location of the first image data, based at least in part on the first value corresponding to the first metric, the second value corresponding to the second metric, and the first sum;

determine a second weighted average value for the second pixel location of the second image data, based at least in part on the third value corresponding to the first metric, the fourth value corresponding to the second metric, and the second sum;

generate the first merged weight map by assigning the first weighted average value to the first pixel location of the first merged weight map; and generate the second merged weight map by assigning the second weighted average value to the second pixel location of the second merged weight map.

18. The computing device of claim 15, wherein the instructions when executed further cause the computing device to:

determine a first median image metric value associated with the first image data, the first median image metric value corresponding to an image metric;

determine a second median image metric value associated with the second image data, the second median image metric value corresponding to the image metric;

determine, for a first pixel location of the first image data, a first difference between the first median image metric value and a first image metric value associated with the first pixel location;

determine, for a second pixel location of the second image data, a second difference between the second median image metric value and a second image metric value associated with the second pixel location;

generate a first binary map associated with the first image data, the first binary map comprising white binary pixel data and black binary pixel data, the white binary pixel data associated with pixel locations of the first image data wherein the first difference is less than a threshold amount and the black binary pixel data associated with pixel locations of the first image data wherein the first difference is greater than a threshold amount; and generate a second binary map associated with the second image data, the second binary map comprising white binary pixel data and black binary pixel data, the white binary pixel data associated with pixel locations of the second image data wherein the second difference is less than a threshold amount and the black binary pixel data associated with pixel locations of the second image data wherein the second difference is greater than a threshold amount.

19. The computing device of claim 15, wherein the instructions when executed further cause the computing device to:

capture third image data using the image capture element;

determine a third median image metric value associated with the third image data, the third median image metric value corresponding to the image metric;

determine, for a third pixel location of the third image data, a third difference between the third median image metric value and a third image metric value associated with the second pixel location;

generate a third binary map associated with the third image data, the third binary map comprising white binary pixel data and black binary pixel data, the white binary pixel data associated with pixel locations of the third image data wherein the third difference is less than a threshold amount and the black binary pixel data associated with pixel locations of the third image data wherein the third difference is greater than a threshold amount;

compare the respective pixel locations associated with the white binary pixel data of the first, second, and third binary maps;

determine, based at least in part on the comparison, that the third image data is outside a threshold range of alignment with the first image data and the second image data; and discard the third image data.

20. The computing device of claim 15, wherein the instructions when executed further cause the computing device to:

capture third image data using the image capture element;

determine a third median image metric value associated with the third image data, the third median image metric value corresponding to the image metric;

determine, for a third pixel location of the third image data, a third difference between the third median image metric value and a third image metric value associated with the second pixel location;

generate a third binary map associated with the third image data, the third binary map comprising white binary pixel data and black binary pixel data, the white binary pixel data associated with pixel locations of the third image data wherein the third difference is less than a threshold amount and the black binary pixel data associated with pixel locations of the third image data wherein the third difference is greater than a threshold amount;

determine that an amount of black pixel data in the third binary map exceeds a threshold value; and discard the third image data.

* * * * *